US012535461B2

(12) United States Patent
Onuma

(10) Patent No.: US 12,535,461 B2
(45) Date of Patent: Jan. 27, 2026

(54) SAMPLE ANALYSIS METHOD, CAPILLARY ELECTROPHORESIS SOLUTION, AND SAMPLE ANALYSIS KIT

(71) Applicant: ARKRAY, Inc., Kyoto (JP)

(72) Inventor: Naotsugu Onuma, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 205 days.

(21) Appl. No.: 18/464,771

(22) Filed: Sep. 11, 2023

(65) Prior Publication Data
US 2024/0102961 A1 Mar. 28, 2024

(30) Foreign Application Priority Data

Sep. 13, 2022 (JP) ................................. 2022-145645

(51) Int. Cl.
*G01N 27/447* (2006.01)

(52) U.S. Cl.
CPC . G01N 27/44791 (2013.01); G01N 27/44721 (2013.01); G01N 27/44743 (2013.01); G01N 27/44747 (2013.01)

(58) Field of Classification Search
CPC ....... G01N 27/44704; G01N 27/44721; G01N 27/44743; G01N 27/44747; G01N 27/44756; G01N 27/44791; G01N 27/44795
See application file for complete search history.

(56) References Cited

U.S. PATENT DOCUMENTS

| | | | |
|---|---|---|---|
| 2006/0102478 A1 | 5/2006 | Robert et al. | |
| 2010/0006436 A1 | 1/2010 | Oishi et al. | |
| 2011/0000788 A1 | 1/2011 | Robert et al. | |
| 2016/0077052 A1 | 3/2016 | Deschamps et al. | |
| 2016/0209359 A1* | 7/2016 | Onuma | ............ G01N 27/44791 |

FOREIGN PATENT DOCUMENTS

| | | |
|---|---|---|
| JP | 2006-145537 A | 6/2006 |
| JP | 2009-109230 A | 5/2009 |
| JP | 2012-531609 A | 12/2012 |
| JP | 6052927 B2 | 12/2016 |

OTHER PUBLICATIONS

H. Katano, Application of Polyammonium Cations to Enzyme-immobilized Electrode: Voltammetric Behavior of Polycation-hexacyanoferrate Anion Complexes and Applicability as Electron-Transfer Mediator, Analytical Sciences, 2008 (24), p. 1415-1419 (Year: 2008).*
Extended European Search Report issued in the corresponding Application No. 23196382.8, dated Feb. 15, 2024.

* cited by examiner

*Primary Examiner* — C. Sun
(74) *Attorney, Agent, or Firm* — Morgan, Lewis & Bockius LLP

(57) ABSTRACT

Provided are a sample analysis method comprising: separating hemoglobin in a sample from the sample comprising the hemoglobin, in an alkaline solution by capillary electrophoresis, wherein the alkaline solution comprises a cationic polymer having a secondary amino group and a quaternary ammonium base.

16 Claims, 3 Drawing Sheets

SAMPLE ANALYSIS METHOD, CAPILLARY ELECTROPHORESIS SOLUTION, AND SAMPLE ANALYSIS KIT

CROSS-REFERENCE TO RELATED APPLICATION

This application is based on and claims priority under 35 USC 119 from Japanese Patent Application No. 2022-145645, filed on Sep. 13, 2022, the disclosure of which is incorporated by reference herein.

BACKGROUND

Technical Field

The present disclosure relates to a sample analysis method, a capillary electrophoresis solution, and a sample analysis kit.

Related Art

Analysis of hemoglobin (hereinafter, also referred to as "Hb") is routinely performed in the field of clinical examination. The Hb type that is the analysis target varies depending on the purpose of the examination. HbA1c is well known as an analysis target for diagnosing diabetes and understanding the condition of diabetes. Mutant Hbs represented by HbS (sickle cell Hb), HbC, HbD, HbE, and the like are used as analysis targets for diagnosing abnormal Hb disease. In addition, HbA2 and HbF (fetal Hb) are widely used as analysis targets for diagnosing β-thalassemia.

Analysis of Hb is performed by a high performance liquid chromatography (HPLC) method such as an ion exchange chromatography method, a capillary electrophoresis (CE) method, or the like.

Japanese Patent Application Laid-Open (JP-A) No. 2006-145537 discloses a method for analyzing Hb by a free solution capillary electrophoresis method (capillary zone electrophoresis, CZE). Japanese National-Phase Publication (JP-A) No. 2012-531609 discloses a method for analyzing Hb in which capillary electrophoresis is performed in the presence of a boronate compound. Japanese Patent Application Laid-Open (JP-A) No. 2009-109230 discloses a method for analyzing Hb by cation exchange electrokinetic chromatography using a solution containing an anionic polymer as a pseudo stationary phase.

In addition, Japanese Patent Publication (JP-B) No. 6052927 discloses a sample analysis method, which is a method for analyzing a sample, including separating hemoglobin from a sample by capillary electrophoresis, and separating the hemoglobin in an alkaline solution containing a cationic polymer.

SUMMARY

The inventor of the present invention has found that, since some types of Hb have similar structures, separation accuracy is not sufficient and there is room for improvement of conventional methods for analyzing Hb by capillary electrophoresis.

An object of an embodiment of the disclosure is to provide a sample analysis method, a capillary electrophoresis solution, and a sample analysis kit, which enable separation of Hb.

A sample analysis method according to an embodiment of the disclosure includes a separation step of separating hemoglobin from a sample containing the hemoglobin, in an alkaline solution by capillary electrophoresis, wherein the alkaline solution contains a cationic polymer having a secondary amino group and a quaternary ammonium base.

According to an embodiment of the disclosure, it is possible to provide a sample analysis method, a capillary electrophoresis solution, and a sample analysis kit capable of separating Hb.

BRIEF DESCRIPTION OF THE DRAWINGS

Exemplary embodiments of the present disclosure will be described in detail based on the following figures, wherein:

FIG. 1, panel B is a cross-sectional view of the electrophoresis chip illustrated in FIG. 1, panel A;

DETAILED DESCRIPTION

Figure 1:
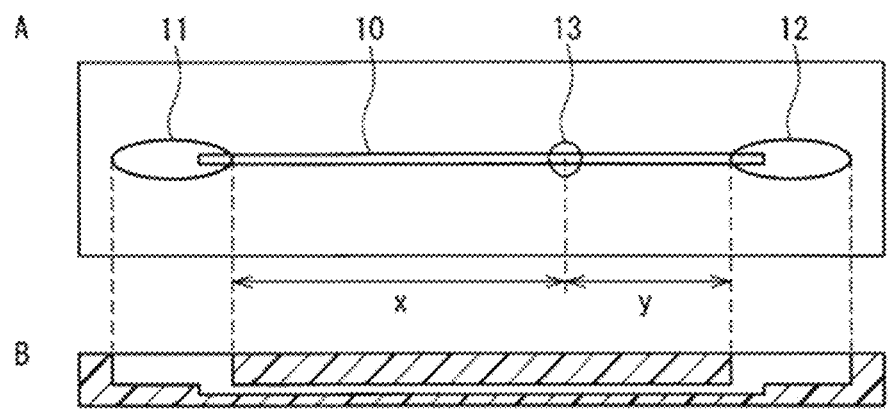
FIG. 1, panel A is a top view illustrating an embodiment of a capillary electrophoresis chip.

Hereinafter, an embodiment which is an example of the present invention will be described. These descriptions and examples illustrate embodiments and do not limit the scope of the invention.

In the numerical ranges described step by step in the present disclosure, the upper limit value or the lower limit value of one numerical range may be replaced with the upper limit value or the lower limit value of another numerical range described step by step. Moreover, in the numerical ranges described in the disclosure, the upper limit value or the lower limit value of the numerical ranges may be replaced with the values illustrated in the examples.

Each component may contain a plurality of types of corresponding substances.

In a case in which there are a plurality of types of substances corresponding to each component in the composition, the amount of each component in the composition means the total amount of the plurality of types of substances present in the composition unless otherwise specified.

In the disclosure, the term "step" includes not only an independent step but also a step that cannot be clearly distinguished from other steps as long as the intended purpose of the step is achieved.

In the present disclosure, a combination of two or more preferred aspects is a more preferred aspect.

When an embodiment is described with reference to the drawings in the present disclosure, the configuration of the embodiment is not limited to the configuration illustrated in the drawings. In addition, the sizes of the members in each drawing are conceptual, and the relative relationship between the sizes of the members is not limited thereto.

[Sample Analysis Method]

A sample analysis method according to the embodiment of the disclosure (hereinafter also referred to as a "specific sample analysis method") includes a separation step of separating hemoglobin from a sample containing the hemoglobin, in an alkaline solution by capillary electrophoresis, wherein the alkaline solution (hereinafter also referred to as a "specific alkaline solution") contains a cationic polymer having a secondary amino group and a quaternary ammonium base.

According to the specific sample analysis method, Hb can be separated. The reason why the above effect is exhibited is not clear, but it is presumed as follows. The separation of Hb having similar structures such as HbA2 or HbE is performed in an alkaline solution containing a cationic polymer having a secondary amino group and a quaternary ammonium base according to the specific sample analysis method.

Since the isoelectric points of HbA2 and HbE are near neutral, HbA2 and HbE are charged negatively in the alkaline solution. The negatively charged HbA2 and HbE are moved to the positive electrode side by bringing the negative electrode into contact with the sample introduction side and applying a voltage.

On the other hand, the cationic polymer has a quaternary ammonium base, and moves from the positive electrode side to the negative electrode side in a state of being bound to HbA2 and HbE by a secondary amino group.

In the alkaline solution, there is a difference in the degree of negative charge of HbA2 and HbE. It is presumed that the difference in charge causes a difference in electrophoresis speed between HbA2 and HbE, and Hb having similar structures such as HbA2 or HbE is separated from a sample containing hemoglobin with excellent accuracy.

Furthermore, the cationic polymer used in the specific sample analysis method has a secondary amino group and a quaternary ammonium base, and accordingly, a difference in ease of binding to Hb having similar structures such as HbA2 or HbE is caused. Accordingly, it is presumed to improve the accuracy of separation.

In addition, the sample analysis method according to an embodiment of the present disclosure can be analyzed by a small device as compared with a high performance liquid chromatography (HPLC) method.

In addition, in the conventional method for analyzing Hb by capillary electrophoresis, the separation accuracy of HbA and HbG is not sufficient.

For the same reason as described above, according to the specific sample analysis method, it is also possible to separate HbA and HbG for which separation accuracy is not sufficient in the conventional analysis method.

For the same reason as described above, separation of HbA2, HbA, and HbS is also possible.

<Separation Step>

The specific sample analysis method includes a separation step of separating Hb in a sample, in an alkaline solution by capillary electrophoresis.

In the separation step, HbA2 and HbE are preferably separated from the sample.

In addition, HbA and HbG are preferably separated from the sample in the separation step.

In addition, HbA2, HbA, and HbS are preferably separated from the sample in the separation step.

In addition to the above, in the separation step, one or more selected from the group consisting of HbF, HbC, and HbD are preferably separated from the sample.

Separation of Hb in the sample, in the alkaline solution by capillary electrophoresis can be performed by introducing the sample into the capillary flow path filled with the alkaline solution, and applying a voltage to the whole or a part of the capillary flow path after introduction of the sample. By applying the voltage, Hb in the sample can be electrophoresed and separated from the sample.

The voltage can be applied to the capillary flow path by bringing a negative electrode into contact with the sample introduction side of the capillary flow path and bringing a positive electrode into contact with the alkaline solution supply side.

The cross-sectional shape of the capillary flow path is not particularly limited, and may be a circular shape, a rectangular shape, or other shapes.

In the case of the rectangular shape, each of the flow path height and the flow path width of the capillary flow path is preferably from 1 to 1000 μm, more preferably from 10 to 200 μm, and still more preferably from 25 μm to 100 μm. In the case of the circular shape, the inner diameter of the capillary flow path is preferably 10 μm or more or 25 μm or more, and preferably from 100 μm or less or 75 μm or less.

The flow path length of the capillary flow path is preferably from 10 mm to 150 mm, and more preferably from 20 mm to 60 mm.

Examples of the material of the capillary flow path include glass, fused silica, and plastic. Examples of the plastic include polymethyl methacrylate (PMMA), polycarbonate, polystyrene, polytetrafluoroethylene (PTFE), and polyetheretherketone (PEEK).

In the separation step, a capillary electrophoresis chip in which the above-described capillary flow path is made into a microchip may be used.

The capillary electrophoresis chip can include a sample holding tank, an electrophoretic liquid holding tank, and a capillary flow path, in which the sample holding tank and the electrophoretic liquid holding tank are communicated with each other via the capillary flow path.

The size of the capillary electrophoresis chip is not particularly limited, and is preferably appropriately adjusted. The size of the capillary electrophoresis chip can be, for example, from 10 mm to 200 mm in length, from 1 mm to 60 mm in width, and from 0.3 mm to 5 mm in thickness.

The volumes of the sample holding tank and the electrophoretic liquid holding tank are appropriately determined according to the inner diameter and the length of the capillary flow path, and are each preferably from 1 $mm^3$ to 1000 $mm^3$, and more preferably from 5 $mm^3$ to 100 $mm^3$.

The amount of the sample to be filled into the sample holding tank is not particularly limited, and may be from 1 μL to 30 μL.

The amount of the alkaline solution to be filled into the electrophoretic liquid holding tank is not particularly limited, and may be from 1 μL to 30 μL.

The voltage applied to both ends of the capillary flow path is preferably from 500 V to 10,000 V, and more preferably from 500 V to 5,000 V.

In the capillary flow path, a liquid flow from the negative electrode side toward the positive electrode side may be generated. Examples of the liquid flow include an electroosmotic flow.

The inner wall of the capillary flow path is preferably coated with a cationic substance or an anionic substance.

By coating the inner wall of the capillary flow path with the cationic substance, the inner wall of the capillary flow path can be positively charged. As a result, an electroosmotic flow from the negative electrode side toward the positive electrode side can be easily generated in the capillary flow path.

When the inner wall of the capillary flow path is coated with the anionic substance, the inner wall of the capillary flow path is negatively charged, but the cationic polymer contained in the alkaline solution is bound to the inner wall of the negatively charged capillary flow path. As a result, the inner wall of the capillary flow path is positively charged, and the electroosmotic flow from the negative electrode side toward the positive electrode side can be easily generated in the capillary flow path as described above.

The cationic substance is not particularly limited, and a silane coupling agent having a cationic functional group and the like can be used. From the viewpoint of improving the separation accuracy, the cationic substance is preferably a polymer having a quaternary ammonium base.

The anionic substance is not particularly limited, and polysaccharides having an anionic group, silane coupling agents having an anionic functional group, and the like can be used.

Examples of the polysaccharide having an anionic group include sulfated polysaccharides, carboxylated polysaccharides, sulfonated polysaccharides, and phosphorylated polysaccharides.

Examples of the sulfated polysaccharide include chondroitin sulfate, heparin, heparan, fucoidan, and salts thereof. Examples of the carboxylated polysaccharide include alginic acid, hyaluronic acid, and salts thereof.

FIGS. 1, panel A and 1, panel B illustrate an embodiment of a capillary electrophoresis chip. FIG. 1, panel A is a top view illustrating an embodiment of a capillary electrophoresis chip, and FIG. 1, panel B is a cross-sectional view of the electrophoresis chip illustrated in FIG. 1, panel A.

The capillary electrophoresis chip illustrated in FIGS. 1, panel A and 1, panel B includes a capillary flow path 10, a sample holding tank 11, and an electrophoretic liquid holding tank 12, and the sample holding tank 11 and the electrophoretic liquid holding tank 12 are communicated with each other via the capillary flow path 10. A detection unit 13 is formed in the capillary flow path 10.

The sample holding tank 11 and the electrophoretic liquid holding tank 12 may each include an electrode for applying a voltage to both ends of the capillary flow path 10 (not illustrated). Specifically, the sample holding tank 11 (sample introduction side) may include a negative electrode, and the electrophoretic liquid holding tank 12 (alkaline solution supply side) may include a positive electrode.

The position of the detection unit 13, that is, the length required for the separation (distance from the sample holding tank 11 to the detection unit 13, x in FIG. 1, panel A) can be appropriately determined according to the length of the capillary flow path 10 or the like. When the length (x+y in FIG. 1, panel A) of the capillary flow path 10 is from 10 mm to 150 mm, the distance (x) from the sample holding tank 11 to the detection unit 13 is preferably from 5 mm to 140 mm, more preferably from 10 mm to 100 mm, and still more preferably from 15 mm to 50 mm.

—Specific Alkaline Solution—

In the disclosure, "alkaline" means that the pH is 7.0 or more. The pH of the specific alkaline solution is preferably higher than the isoelectric points of HbA2 and HbE, and is preferably from 7.5 to 12.0, more preferably from 8.5 to 11.0, and still more preferably from 9.5 to 10.5.

In the disclosure, the pH of the alkaline solution is the pH of the alkaline solution at 25° C., and is measured using a pH meter 30 minutes after the electrode is immersed. As the pH meter, F-72 manufactured by HORIBA, Ltd. or a device similar thereto can be used.

The specific alkaline solution contains a cationic polymer having a secondary amino group and a quaternary ammonium base (hereinafter also referred to as a "specific cationic polymer").

In the disclosure, the "cationic polymer" means a polymer having a cationic group.

In the disclosure, the "cationic group" includes a cationic group and a group that is ionized to become a cationic group.

The secondary amino group and the quaternary ammonium base correspond to a cationic group.

The specific cationic polymer may have a cationic group other than the secondary amino group and the quaternary ammonium base (hereinafter also referred to as "other cationic group").

Examples of other cationic groups include a primary amino group, a tertiary amino group, and an imino group.

In the specific cationic polymer, the content of the secondary amino group and the quaternary ammonium base with respect to the total mass of the secondary amino group, the quaternary ammonium base, and other cationic groups is preferably 50% by mass or more, more preferably 70% by mass or more, still more preferably 80% by mass or more, even more preferably 90% by mass or more, particularly preferably 95% by mass or more, and most preferably 100% by mass from the viewpoint of improving the separation accuracy.

From the viewpoint of improving the separation accuracy, the specific cationic polymer preferably has a structure represented by Formula (1) and a structure represented by Formula (2). The nitrogen atom (N) in Formula (1) constitutes a quaternary ammonium base, and the nitrogen atom (N) in Formula (2) constitutes a secondary amino group.

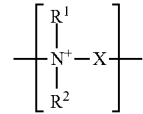

(1)

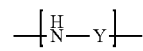

(2)

In Formula (1), each of $R^1$ and $R^2$ independently represents an alkyl group having a substituent and having from 1 to 10 carbon atoms or an unsubstituted alkyl group having from 1 to 10 carbon atoms, and X represents a divalent linking group, and in Formula (2), Y represents a divalent linking group.

From the viewpoint of improving the separation accuracy, each of $R^1$ and $R^2$ independently preferably represents an alkyl group having a substituent and having from 1 to 6 carbon atoms or an unsubstituted alkyl group having from 1 to 6 carbon atoms, more preferably represent an alkyl group having a substituent and having from 1 to 3 carbon atoms or an unsubstituted alkyl group having from 1 to 3 carbon atoms, further preferably represent an unsubstituted alkyl group having from 1 to 3 carbon atoms, particularly preferably represent a methyl group or an ethyl group, and most preferably represent a methyl group.

Examples of the substituent include a halogen atom, a hydroxy group, an amino group, a nitro group, a cyano group, and a sulfo group.

From the viewpoint of improving the separation accuracy, each of X and Y independently preferably represents an alkylene group having a substituent and having from 1 to 10 carbon atoms or an unsubstituted alkylene group having from 1 to 10 carbon atoms, more preferably represent an alkylene group having a substituent and having from 1 to 6 carbon atoms or an unsubstituted alkylene group having from 1 to 6 carbon atoms, further preferably represent an alkylene group having a substituent and having from 1 to 6 carbon atoms, particularly preferably represent an alkylene group having a substituent and having from 3 to 6 carbon atoms, and an alkylene group having a substituent and having 3 carbon atoms.

Examples of the substituent include a halogen atom, a hydroxy group, an amino group, a nitro group, a cyano group, and a sulfo group, and a hydroxy group is preferable from the viewpoint of improving the separation accuracy.

Therefore, from the viewpoint of improving the separation accuracy, each of X and Y independently preferably represents an alkylene group having a hydroxy group and having from 1 to 6 carbon atoms, more preferably represent an alkylene group having a hydroxy group and having from 3 to 6 carbon atoms, further preferably represent an alkylene group having a hydroxy group and having from 3 carbon atoms, and particularly preferably represent a 2-hydroxypropylene group.

Examples of the specific cationic polymer having the structure represented by Formula (1) and the structure represented by Formula (2) include a dimethylamine-ammonia-epichlorohydrin polycondensate (CAS No. 52722-38-0), and a dimethylamine-ammonia-epichlorohydrin polycondensate is preferable from the viewpoint of improving the separation accuracy.

The dimethylamine-ammonia-epichlorohydrin polycondensate can be represented by the following Formula (3).

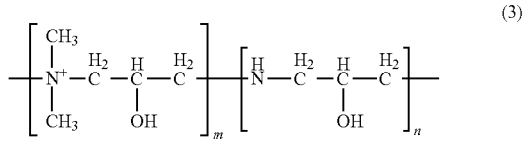

(3)

In Formula (3), each of m and n is independently an integer from 1 to 1,000.

From the viewpoint of improving the separation accuracy, the weight average molecular weight of the specific cationic polymer is preferably from 10,000 to 700,000, more preferably from 100,000 to 600,000, and still more preferably from 200,000 to 500,000.

In the disclosure, the weight average molecular weight of the cationic polymer refers to the catalogue value. When there is no catalog value of the weight average molecular weight, the weight average molecular weight is a weight average molecular weight in terms of polyethylene glycol measured by a gel permeation chromatography (GPC) method.

From the viewpoint of improving the separation accuracy, the content of the specific cationic polymer with respect to the total mass of the specific alkaline solution is preferably from 0.1% by mass to 5.0% by mass, more preferably from 0.7% by mass to 3.0% by mass, and still more preferably from 1.0% by mass to 2.0% by mass.

As the specific cationic polymer, a polymer synthesized by a conventionally known method may be used, or a commercially available polymer may be used.

Examples of commercially available products of the specific cationic polymer include Unisense KHE 1000L manufactured by SENKA corporation.

Examples of the method for synthesizing the specific cationic polymer include a method in which dimethylamine, ammonia, and epichlorohydrin are mixed and polycondensed.

The specific alkaline solution may contain a cationic polymer other than the specific cationic polymer (hereinafter also referred to as "other cationic polymer"). Examples of other cationic polymers include polyallylamine, polyvinylamine, polylysine, polyarginine, polyhistidine, polyornithine, polydiallylamine, polymethyldiallylamine, polyethyleneimine, polyquaternium, and dimethylamine-epichlorohydrin polycondensate. In the disclosure, "polyquaternium" refers to a cationic polymer containing a constituent unit derived from a monomer having a quaternary ammonium group. Examples of the polyquaternium include polydiallyldimethylammonium salts such as polyquaternium-6 (poly(diallyldimethylammonium chloride)), polyquaternium-7 (copolymer of acrylamide and diallyldimethylammonium chloride), polyquaternium-4 (diallyldimethylammonium chloride-hydroxyethyl cellulose copolymer), and polyquaternium-22 (copolymer of acrylic acid and diallyldimethylammonium chloride); and polyquaternium-2 (poly[bis(2-chloroethyl)ether-alt-1,3-bis[3-(dimethylamino)propyl]urea]).

From the viewpoint of improving the separation accuracy, the content of the other cationic polymer with respect to the total mass of the specific alkaline solution is preferably 5.0% by mass or less, more preferably 3.0% by mass or less, still more preferably 1.0% by mass or less, particularly preferably 0.01% by mass or less, and most preferably, no other cationic polymer is contained.

The specific alkaline solution may contain water. Examples of the water include distilled water, ion-exchanged water, pure water, and ultrapure water.

The content of water with respect to the total mass of the specific alkaline solution is not particularly limited, and may be from 10% by mass to 99.9% by mass.

The specific alkaline solution may contain additives such as a non-surfactant type zwitterionic substance, a pH buffering substance, and a preservative for suppressing proliferation of microorganisms and the like. Examples of the preservative include sodium azide, ethylparaben, and ProClin.

—Sample—

The sample preferably contains Hb and contains HbA2 and HbE. The content of Hb with respect to the total mass of the sample is not particularly limited, and may be from 0.001% by mass to 100% by mass. In addition, when the sample contains HbA2 and HbE, the contents of HbA2 and HbE with respect to the total mass of the sample are not particularly limited, and can be from 0.0001% by mass to 100% by mass, respectively. In addition, when the sample contains HbA and HbG, the contents of HbA2, HbA, and HbG with respect to the total mass of the sample are not particularly limited, and can be from 0.0001% by mass to 100% by mass, respectively. In addition, when the sample contains HbA2, HbA, and HbS, the content of HbA2, HbA, and HbS with respect to the total mass of the sample is not particularly limited, and can be from 0.0001% by mass to 100% by mass, respectively.

The form of the sample is not particularly limited, and the sample raw material may be prepared, or may be the sample raw material itself.

Examples of the sample raw material include raw materials containing Hb, biological samples, and the like.

Examples of the biological sample include blood and a blood derivative containing a red blood cell component or the like.

Examples of the blood include blood collected from a living body, and include blood of mammals other than human, and blood of human.

Examples of the blood derivative containing a red blood cell component include those separated or prepared from blood and containing a red blood cell component. Examples thereof include a blood cell fraction from which plasma is removed, a blood cell concentrate, a lyophilizate of blood or blood cells, a hemolysis sample obtained by hemolysis of whole blood, centrifuged blood, naturally precipitated blood, and washed blood cells.

From the viewpoint of improving the separation accuracy, the sample preferably contains an alkaline solution containing a cationic polymer.

The sample containing the alkaline solution can be obtained by diluting the sample raw material using the alkaline solution. The dilution rate is preferably from 1.2 times to 100 times, more preferably from 2 times to 60 times, and still more preferably from 3 times to 50 times on a mass basis. The material used for dilution is not particularly limited, and examples thereof include a pH adjusting agent (for example, hydrochloric acid), a surfactant (for example, EMULGEN LS-110 (manufactured by Kao Corporation)), an antiseptic agent (for example, sodium azide), an ionic strength adjusting agent (for example, sodium chloride), and a refractive index adjusting agent (for example, saccharides such as sucrose).

The cationic polymer may be a specific cationic polymer or need not be a specific cationic polymer. Examples of the cationic polymer that is not the specific cationic polymer include polyethyleneimine.

The alkaline solution may be the same as or different from the specific alkaline solution filled into the capillary flow path.

<Detection Step>

The specific sample analysis method can include a detection step of detecting Hb separated from the sample in the separation step.

Detection of Hb can be performed by detecting Hb by an optical method. Examples of the detection by an optical method include measurement of absorbance.

More specifically, Hb can be detected by irradiating separated Hb with light having a wavelength from 415 to 420 nm to obtain an absorbance spectrum in which the vertical axis represents absorbance and the horizontal axis represents time.

When a capillary electrophoresis chip is used for separating Hb, it is preferable to irradiate the detection unit with light having a wavelength from 415 to 420 nm.

The absorbance spectrum can be obtained by using The Lab 001 manufactured by ARKRAY, Inc. or a device similar thereto.

Hb may be detected using an electropherogram (differential waveform) obtained by differentiating the waveform of the absorbance spectrum with respect to time.

The detection is performed by a method described in Japanese Patent Application Laid-Open (JP-A) No. 2019-78599.

Specifically, the following procedure is performed.
1) The electro-osmotic flow (EOF) signal is identified.
2) With the EOF signal as a starting point, a peak having an area ratio (peak area/total peak area) detected first of 1% or more is defined as a HbA2 peak.
3) Time is normalized based on the EOF signal and the HbA2 peak. For example, the EOF signal is 0 seconds, and the HbA2 peak is 1 second.
4) Other Hb fractions are identified by comparing with a predetermined "relationship between normalization time and Hb fraction".

An embodiment of a specific sample analysis method will be described with reference to FIGS. 1A and 1B. The specific sample analysis method is not limited to that described below.

First, the electrophoretic liquid holding tank 12 of the capillary electrophoresis chip is filled with a specific alkaline solution containing a specific cationic polymer as an electrophoretic liquid, and the capillary flow path 10 is filled with the specific alkaline solution by capillary phenomenon.

Next, a sample is added to the sample holding tank 11 of the capillary electrophoresis chip filled with the specific alkaline solution.

The sample to be added to the sample holding tank 11 can be prepared by diluting whole blood, which is a sample raw material, with the alkaline solution.

A negative electrode is brought into contact with the sample holding tank 11, and a positive electrode is brought into contact with the electrophoretic liquid holding tank 12 (not illustrated), and a voltage is applied between both ends of the capillary flow path 10, that is, between the sample holding tank 11 and the electrophoretic liquid holding tank 12. As a result, a sample is introduced from the sample holding tank 11 into the capillary flow path 10, a sample containing Hb moves from the sample holding tank 11 toward the electrophoretic liquid holding tank 12, and separation of Hb is performed.

Then, the detection unit 13 emits light having a wavelength from 415 nm to 420 nm, and the absorbance measurement device measures the absorbance to detect Hb.

The sample analysis method of the disclosure can be used for applications such as prevention, diagnosis, and treatment of abnormal Hb disease and β-thalassemia.

[Capillary Electrophoresis Solution] A capillary electrophoresis solution according to the embodiment of the disclosure contains a cationic polymer having a secondary amino group and a quaternary ammonium base and is used for separation of Hb by capillary electrophoresis.

The capillary electrophoresis solution according to the embodiment of the disclosure can be used for separation of HbA2 and HbE. In addition, the capillary electrophoresis solution according to the embodiment of the disclosure can be used for separation of HbA and HbG. In addition, the capillary electrophoresis solution according to the embodiment of the disclosure can be used for separation of HbA2, HbA, and HbS.

A preferred aspect of the capillary electrophoresis solution is the same as the specific alkaline solution used in the specific sample analysis method, and thus the description thereof will be omitted here.

[Sample Analysis Kit] A sample analysis kit according to the embodiment of the disclosure includes: a container containing the capillary electrophoresis solution according to the description above; and an electrophoresis chip which includes a sample holding tank, an electrophoretic liquid holding tank, and a capillary flow path, in which the sample holding tank and the electrophoretic liquid holding tank are communicated with each other via the capillary flow path.

Preferred aspects of the capillary electrophoresis solution and the electrophoresis chip are the same as those of the specific alkaline solution and the electrophoresis chip used in the specific sample analysis method, and thus the description thereof will be omitted here.

Examples of the material of the container containing the capillary electrophoresis solution include glass, fused silica, and plastic. Since the plastic has been described above, the description thereof will be omitted here.

The present disclosure may relate to the following embodiments.
<1> A sample analysis method, including:
a separation step of separating hemoglobin from a sample containing the hemoglobin, in an alkaline solution by capillary electrophoresis,
in which the alkaline solution contains a cationic polymer having a secondary amino group and a quaternary ammonium base.
<2> The sample analysis method according to <1> above, in which the cationic polymer has a structure represented by Formula (1) and represented by Formula (2):

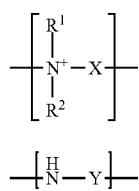

(1)

(2)

in Formula (1),
each of $R^1$ and $R^2$ independently represents an alkyl group having a substituent and having from 1 to 10 carbon atoms or an unsubstituted alkyl group having from 1 to 10 carbon atoms, and
X represents a divalent linking group, and
in Formula (2),
Y represents a divalent linking group.)
<3> The sample analysis method according to <2> above, in which each of X in Formula (1) and Y in Formula (2) independently represents an alkylene group having a substituent and having from 1 to 10 carbon atoms or an unsubstituted alkylene group having from 1 to 10 carbon atoms.
<4> The sample analysis method according to <2> and <3> above, in which each of X in Formula (1) and Y in Formula (2) independently represents an alkylene group having a hydroxy group and 1 to 6 carbon atoms.
<5> The sample analysis method according to any one of <1> to <4> above, in which the cationic polymer is a dimethylamine-ammonia-epichlorohydrin polycondensate.
<6> The sample analysis method according to any one of <1> to <5> above, in which a weight average molecular weight of the cationic polymer is from 100,000 to 500,000.
<7> The sample analysis method according to any one of <1> to <6> above, in which the alkaline solution has a pH from 7.5 to 12.0.
<8> The sample analysis method according to <1> or <2>, in which, in the separation step, hemoglobin A2 and hemoglobin E are separated from the sample.
<9> The sample analysis method according to <1> or <2>, in which, in the separation step, hemoglobin A and hemoglobin G are separated from the sample.
<10> A capillary electrophoresis solution, containing a cationic polymer having a secondary amino group and a quaternary ammonium base,
in which the capillary electrophoresis solution is used for separation of hemoglobin by capillary electrophoresis.
<11> A sample analysis kit, including:
a container including the capillary electrophoresis solution according to <10>; and
an electrophoresis chip which includes a sample holding tank, an electrophoretic liquid holding tank, and a capillary flow path, in which the sample holding tank and the electrophoretic liquid holding tank are communicated with each other via the capillary flow path.

EXAMPLES

Examples will be described below, but the disclosure is not limited to these examples at all. In the following description, unless otherwise specified, "part" and "%" are all on a mass basis.
<Separation Device and Measurement Equipment>
As the separation device, a resin-made chip (flow path width: 40 μm, flow path height: 40 μm, flow path length: 30 mm, distance (x) from sample holding tank 11 to detection unit 13: 20 mm) having the capillary flow path 10 having the structure illustrated in FIG. 1, panels A and B was used. The capacity of the sample holding tank 11 and the electrophoretic liquid holding tank 12 was set to 10 μL. The inner wall of the capillary flow path was coated with polydiallyldimethylammonium chloride.
As the measurement device, an in-house electrophoresis device was used.

Examples 1

Each of the following substances were mixed, and sodium hydroxide and water were added until the pH reached 9.8 to prepare a specific alkaline solution (capillary electrophoresis solution) 1.
(Composition of Specific Alkaline Solution 1)

| | |
|---|---|
| Dimethylamine-ammonia-epichlorohydrin polycondensate (specific cationic polymer, Unisense KHE 1000L, manufactured by SENKA Corporation, weight average molecular weight from 100,000 to 500,000) | 1.5% by mass |
| Sodium azide | 0.02% by mass |

Human whole blood containing HbA2, HbE, HbA, and an anticoagulant (ethylenediaminetetraacetic acid) was diluted (dilution rate 41 times (mass basis)) with an alkaline solution (pH 8.8) having the following composition to obtain the sample A. In addition, hydrochloric acid and water were added until the pH of the solution reached 8.8.
(Composition of Alkaline Solution)

| | |
|---|---|
| Polyethyleneimine (manufactured by FUJIFILM Wako Pure Chemical Corporation, weight average molecular weight 70,000) | 1% by mass |
| EMULGEN LS-110 (manufactured by Kao Corporation) | 0.4% by mass |
| Sodium azide | 0.02% by mass |
| Sucrose | 7.87% by mass |
| Sodium chloride | 0.26% by mass |
| Hydrochloric acid | |
| Water | |

9 μL of the specific alkaline solution 1 was added to the electrophoretic liquid holding tank 12, and the capillary flow path 10 was filled with the specific alkaline solution 1 by capillary phenomenon.
9 μL of the sample A was added to the sample holding tank 11.
Next, a negative electrode was brought into contact with the sample holding tank 11, and a positive electrode was brought into contact with the electrophoretic liquid holding tank 12, and electrophoresis was started by applying a voltage under constant current control of 75 μA.

During electrophoresis, the detection unit 13 was irradiated with light from 415 to 420 nm, and the absorbance was measured to obtain an absorbance spectrum. An electropherogram was obtained by differentiating the waveform of the absorbance spectrum with respect to time. Electrophoresis was performed for 60 seconds. The obtained electropherogram is illustrated in FIG. 2.

Incidentally, The Lab 001 manufactured by ARKRAY, Inc. was used for light irradiation, measurement of absorbance, and acquisition of an electropherogram.

Figure 2:
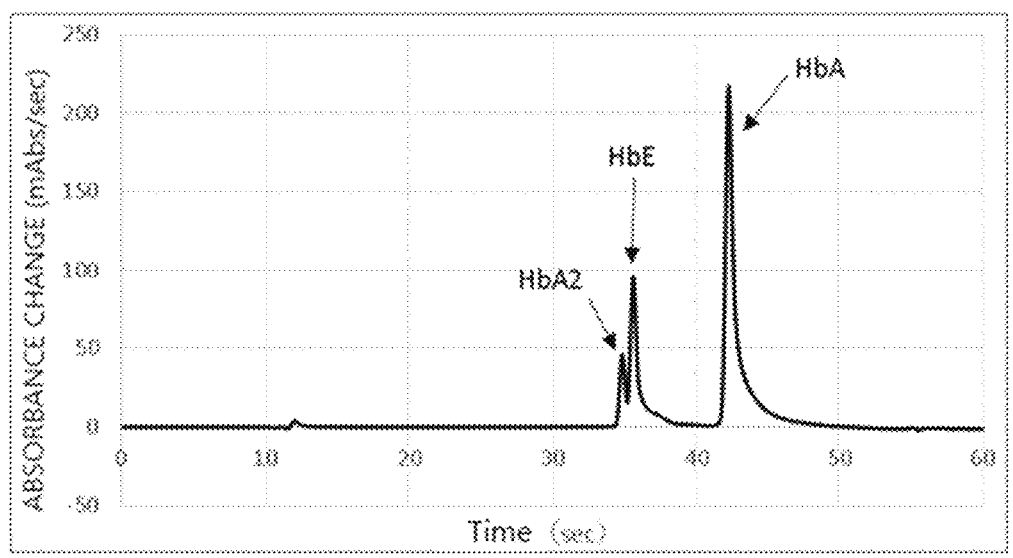
FIG. 2 illustrates an electropherogram obtained by a sample analysis method of Example 1.

As is apparent from the electropherogram illustrated in FIG. 2, according to the sample analysis method of Example 1 using the specific alkaline solution containing the specific cationic polymer, HbA2 and HbE were separated from the sample with excellent accuracy.

Comparative Example 1

Hydroxypropanesulfonic acid and water were added to each of the following substances until the pH reached 9.8 to prepare an alkaline solution a.
(Composition of Alkaline Solution a)

| | |
|---|---|
| Polyallylamine (polymer having primary amino group, manufactured by Nittobo Medical Co., Ltd., weight average molecular weight 150,000) | 0.7% by mass |
| Sodium azide | 0.02% by mass |
| Sodium chloride | 0.09% by mass |
| EMULGEN LS-110 (manufactured by Kao Corporation) | 0.1% by mass |

Human whole blood containing HbA2, HbE, HbA, and an anticoagulant (ethylenediaminetetraacetic acid) was diluted (dilution rate 41 times (mass basis)) with an alkaline solution (pH 9.0) having the following composition to obtain the sample B. In addition, hydrochloric acid and water were added until the pH of the solution reached 9.0.
(Composition of Alkaline Solution)

| | |
|---|---|
| Polyethyleneimine (manufactured by FUJIFILM Wako Pure Chemical Corporation, weight average molecular weight 70,000) | 1% by mass |
| EMULGEN LS-110 (manufactured by Kao Corporation) | 0.4% by mass |
| Sodium azide | 0.02% by mass |
| Sodium chloride | 0.06% by mass |
| 1-(3-sulfopropyl)pyridinium hydroxide intramolecular salt (manufactured by FUJIFILM Wako Pure Chemical Corporation, NDSB-201) | 5.0% by mass |
| Hydroxypropanesulfonic acid | |
| Water | |

Electrophoresis and acquisition of electropherograms were performed in the same manner as in Example 1 except that the specific alkaline solution 1 was changed to the alkaline solution a and the sample A was changed to the sample B. The obtained electropherogram is illustrated in FIG. 3.

Figure 3:
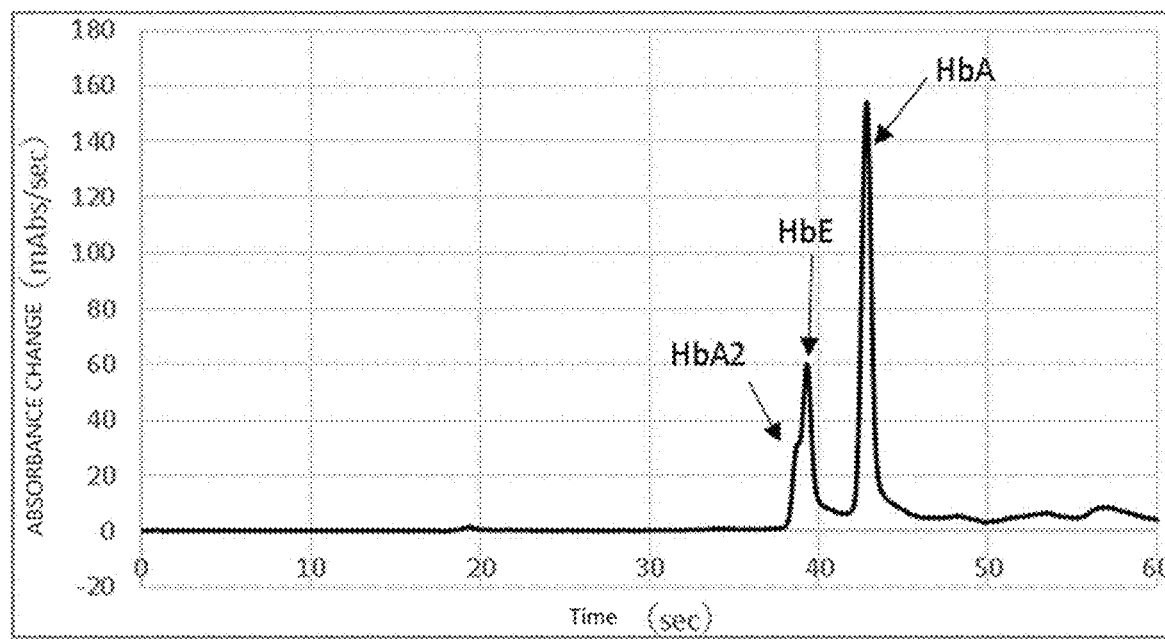
FIG. 3 illustrates an electropherogram obtained by a sample analysis method of Comparative Example 1.

As is apparent from the electropherogram illustrated in FIG. 3, separation of HbA2 and HbE was possible even in Comparative Example 1 in which the specific alkaline solution containing the specific cationic polymer was not used, but the sample analysis method of Example 1 can perform separation with better accuracy.

Example 2

Electrophoresis and acquisition of electropherograms were performed in the same manner as in Example 1 except that the sample A was changed to the sample B prepared as described below. The obtained electropherogram is illustrated in FIG. 4.

Human whole blood containing HbA2, HbA, HbS, and an anticoagulant (ethylenediaminetetraacetic acid) was diluted (dilution rate 41 times (mass basis)) with the alkaline solution (pH 8.8) used in Example 1 to obtain the sample B.

Figure 4:
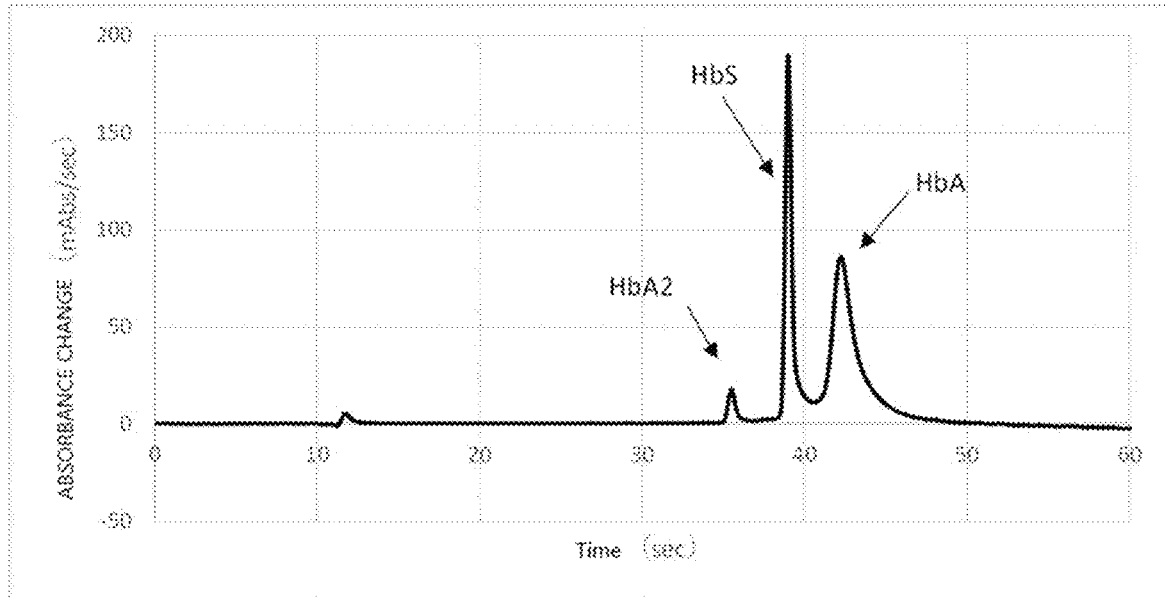
FIG. 4 illustrates an electropherogram obtained by a sample analysis method of Example 2.

As is apparent from the electropherogram illustrated in FIG. 4, according to the sample analysis method of Example 2 using the specific alkaline solution containing the specific cationic polymer, HbA2, HbA, and HbS were separated from the sample with excellent accuracy.

Example 3

Electrophoresis and acquisition of electropherograms were performed in the same manner as in Example 1 except that the sample A was changed to the sample D prepared as described below. The obtained electropherogram is illustrated in FIG. 5.

Human whole blood containing HbA2, HbA, HbG, and an anticoagulant (ethylenediaminetetraacetic acid) was diluted (dilution rate 41 times (mass basis)) with the alkaline solution (pH 8.8) used in Example 1 to obtain the sample D.

Figure 5:
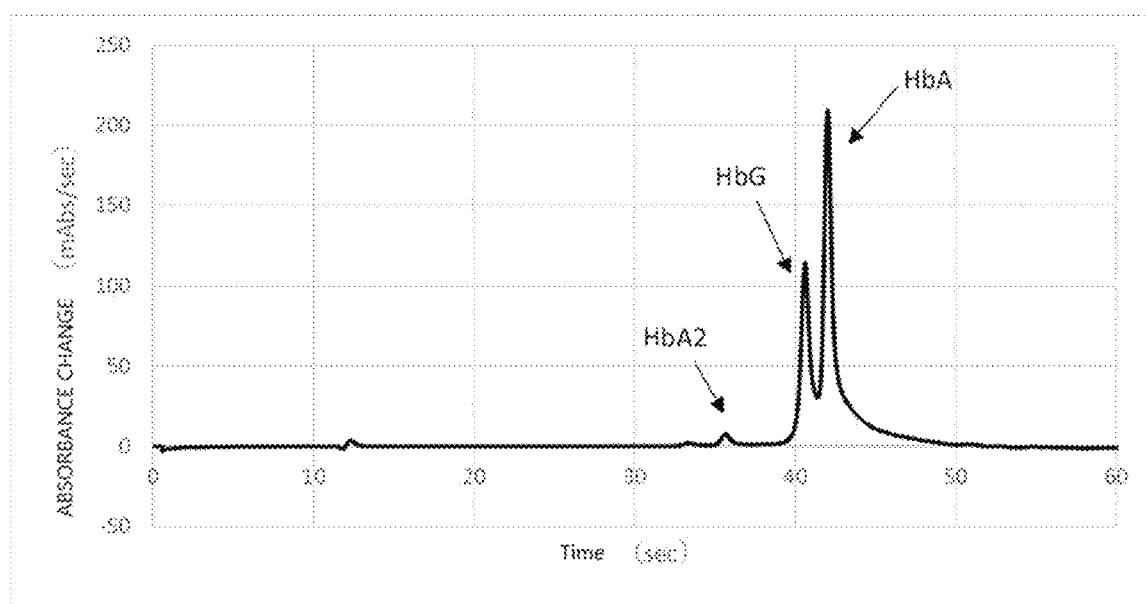
FIG. 5 illustrates an electropherogram obtained by a sample analysis method of Example 3.

As is apparent from the electropherogram illustrated in FIG. 5, according to the sample analysis method of Example 3 using the specific alkaline solution containing the specific cationic polymer, HbA2, HbA, and HbG were separated from the sample with excellent accuracy.

What is claimed is:

1. A sample analysis method, comprising:
    separating hemoglobin from a sample containing the hemoglobin, in an alkaline solution by capillary electrophoresis,
    wherein the alkaline solution comprises a cationic polymer having a secondary amino group and a quaternary ammonium base,
    the cationic polymer has a structure represented by the following Formula (1) and a structure represented by the following Formula (2):

in Formula (1), each of $R^1$ and $R^2$ independently represents an alkyl group having a substituent and having from 1 to 10 carbon atoms or an unsubstituted alkyl group having from 1 to 10 carbon atoms, and X represents a divalent linking group, and
in Formula (2), Y represents a second divalent linking group.

2. The sample analysis method according to claim 1, wherein each of X in Formula (1) and Y in Formula (2) independently represents an alkylene group having a substituent and having from 1 to 10 carbon atoms or an unsubstituted alkylene group having from 1 to 10 carbon atoms.

3. The sample analysis method according to claim 1, wherein each of X in Formula (1) and Y in Formula (2) independently represents an alkylene group having a hydroxy group and 1 to 6 carbon atoms.

4. The sample analysis method according to claim 1, wherein the cationic polymer comprises a dimethylamine-ammonia-epichlorohydrin polycondensate.

5. The sample analysis method according to claim 1, wherein a weight-average molecular weight of the cationic polymer is from 100,000 to 500,000.

6. The sample analysis method according to claim 1, wherein the alkaline solution has a pH from 7.5 to 12.0.

7. The sample analysis method according to claim 1, wherein, in the separating, hemoglobin A2 and hemoglobin E are separated from the sample.

8. The sample analysis method according to claim 1, wherein, in the separating, hemoglobin A and hemoglobin G are separated from the sample.

9. The sample analysis method according to claim 1, wherein a content of the cationic polymer with respect to a total mass of the alkaline solution is from 0.1% by mass to 5.0% by mass.

10. The sample analysis method according to claim 1, wherein a content of the cationic polymer with respect to a total mass of the alkaline solution is from 0.7% by mass to 3.0% by mass.

11. The sample analysis method according to claim 1, wherein a content of the cationic polymer with respect to a total mass of the alkaline solution is from 1.0% by mass to 2.0% by mass.

12. The sample analysis method according to claim 1, wherein the alkaline solution further contains other cationic polymer selected from the group consisting of polyallylamine, polyvinylamine, polylysine, polyarginine, polyhistidine, polyornithine, polydiallylamine, polymethyldiallylamine, polyethyleneimine, polyquaternium, and dimethylamine-epichlorohydrin polycondensate.

13. The sample analysis method according to claim 12, wherein a content of the other cationic polymer with respect to a total mass of the alkaline solution is 5.0% by mass or less.

14. A sample analysis method, comprising:
separating hemoglobin from a sample containing the hemoglobin, in an alkaline solution by capillary electrophoresis,
wherein the alkaline solution comprises a cationic polymer having a secondary amino group and a quaternary ammonium base,
the cationic polymer has a structure represented by the following Formula (1) and a structure represented by the following Formula (2):

in Formula (1), each of $R^1$ and $R^2$ independently represents an alkyl group having a substituent and having from 1 to 10 carbon atoms or an unsubstituted alkyl group having from 1 to 10 carbon atoms, and each of X in Formula (1) and Y in Formula (2) independently represents an alkylene group having a hydroxy group and 1 to 6 carbon atoms.

15. A capillary electrophoresis solution, comprising a cationic polymer having a secondary amino group and a quaternary ammonium base,
wherein the capillary electrophoresis solution is used for separation of hemoglobin by capillary electrophoresis,
the cationic polymer has a structure represented by the following Formula (1) and a structure represented by the following Formula (2):

in Formula (1), each of $R^1$ and $R^2$ independently represents an alkyl group having a substituent and having from 1 to 10 carbon atoms or an unsubstituted alkyl group having from 1 to 10 carbon atoms, and X represents a divalent linking group, and in Formula (2), Y represents a second divalent linking group.

16. A sample analysis kit, comprising:
a container comprising the capillary electrophoresis solution according to claim 15; and
an electrophoresis chip, which comprises a sample holding tank, an electrophoretic liquid holding tank, and a capillary flow path, wherein the sample holding tank and the electrophoretic liquid holding tank are communicated with each other via the capillary flow path.

* * * * *